United States Patent
Ober et al.

(10) Patent No.: US 10,802,713 B2
(45) Date of Patent: Oct. 13, 2020

(54) REQUESTER-ASSOCIATED STORAGE ENTITY DATA

(71) Applicant: International Business Machines Corporation, Armonk, NY (US)

(72) Inventors: Brian F. Ober, Lake in the Hills, IL (US); Matthew T. Schoen, Long Grove, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 172 days.

(21) Appl. No.: 15/720,193

(22) Filed: Sep. 29, 2017

(65) Prior Publication Data
US 2019/0102089 A1  Apr. 4, 2019

(51) Int. Cl.
G06F 3/06 (2006.01)
G06F 16/14 (2019.01)
G06F 16/182 (2019.01)
G06F 11/07 (2006.01)
(Continued)

(52) U.S. Cl.
CPC ............ *G06F 3/0604* (2013.01); *G06F 3/067* (2013.01); *G06F 3/0619* (2013.01); *G06F 3/0643* (2013.01); *G06F 3/0667* (2013.01); *G06F 11/0766* (2013.01); *G06F 11/1076* (2013.01); *G06F 16/14* (2019.01); *G06F 16/182* (2019.01); *G06F 21/6209* (2013.01); *G06F 2212/263* (2013.01)

(58) Field of Classification Search
None
See application file for complete search history.

(56) References Cited

U.S. PATENT DOCUMENTS

| 4,092,732 A | 5/1978 | Ouchi |
| 5,454,101 A | 9/1995 | Mackay et al. |
| 5,485,474 A | 1/1996 | Rabin |

(Continued)

OTHER PUBLICATIONS

Shamir; How to Share a Secret; Communications of the ACM; vol. 22, No. 11; Nov. 1979; pp. 612-613.

(Continued)

*Primary Examiner* — William E. Baughman
(74) *Attorney, Agent, or Firm* — James Nock; Andrew D. Wright; Roberts Calderon Safran & Cole, P.C.

(57) ABSTRACT

A method includes receiving a data access request for a data object from a requesting device of a set of requesting devices associated with the data object. The method further includes determining storage entity data for the data object that includes global metadata, global policies, individual requesting device metadata of each requesting device of the set of requesting devices, and individual requesting device policies of each requesting device of the set of requesting devices. The method further includes determining whether an action of the data access request is compliant with the global policies and consistent with the global metadata. If so, the method further includes determining whether the action triggers one or more global policies and/or one or more individual requesting device polices, and whether global metadata and/or individual requesting device metadata are associated. The method further includes processing the action in accordance with the triggered policies and associated metadata.

14 Claims, 6 Drawing Sheets

(51) Int. Cl.
*G06F 11/10* (2006.01)
*G06F 21/62* (2013.01)

(56) References Cited

U.S. PATENT DOCUMENTS

| | | | |
|---|---|---|---|
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,144,969 A * | 11/2000 | Inokuchi | G06F 16/166 707/705 |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0148399 A1 * | 7/2004 | Fenizia | G06F 21/10 709/227 |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0159109 A1 * | 7/2006 | Lamkin | G11B 27/10 370/401 |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 * | 12/2007 | Venters, III | G06F 21/10 713/189 |
| 2009/0094251 A1 | 4/2009 | Gladwin et al. | |
| 2009/0094318 A1 | 4/2009 | Gladwin et al. | |
| 2010/0023524 A1 * | 1/2010 | Gladwin | G06F 3/0617 707/E17.032 |
| 2010/0094728 A1 * | 4/2010 | Denning | G06Q 30/02 705/26.1 |
| 2012/0166757 A1 * | 6/2012 | Volvovski | G06F 11/1076 711/206 |
| 2014/0281066 A1 * | 9/2014 | Grube | G06F 3/067 710/74 |
| 2018/0176405 A1 * | 6/2018 | Mori | H04N 1/00244 |
| 2018/0234472 A1 * | 8/2018 | Malakar | H04L 67/30 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.
Chung; An Automatic Data Segmentation Method for 3D Measured Data Points; National Taiwan University; pp. 1-8; 1998.
Plank, T1: Erasure Codes for Storage Applications; FAST2005, 4th Usenix Conference on File Storage Technologies; Dec. 13-16, 2005; pp. 1-74.
Wildi; Java iSCSi Initiator; Master Thesis; Department of Computer and Information Science, University of Konstanz; Feb. 2007; 60 pgs.
Legg; Lightweight Directory Access Protocol (LDAP): Syntaxes and Matching Rules; IETF Network Working Group; RFC 4517; Jun. 2006; pp. 1-50.
Zeilenga; Lightweight Directory Access Protocol (LDAP): Internationalized String Preparation; IETF Network Working Group; RFC 4518; Jun. 2006; pp. 1-14.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Zeilenga; Lightweight Directory Access Protocol (LDAP): Directory Information Models; IETF Network Working Group; RFC 4512; Jun. 2006; pp. 1-49.
Sciberras; Lightweight Directory Access Protocol (LDAP): Schema for User Applications; IETF Network Working Group; RFC 4519; Jun. 2006; pp. 1-33.
Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

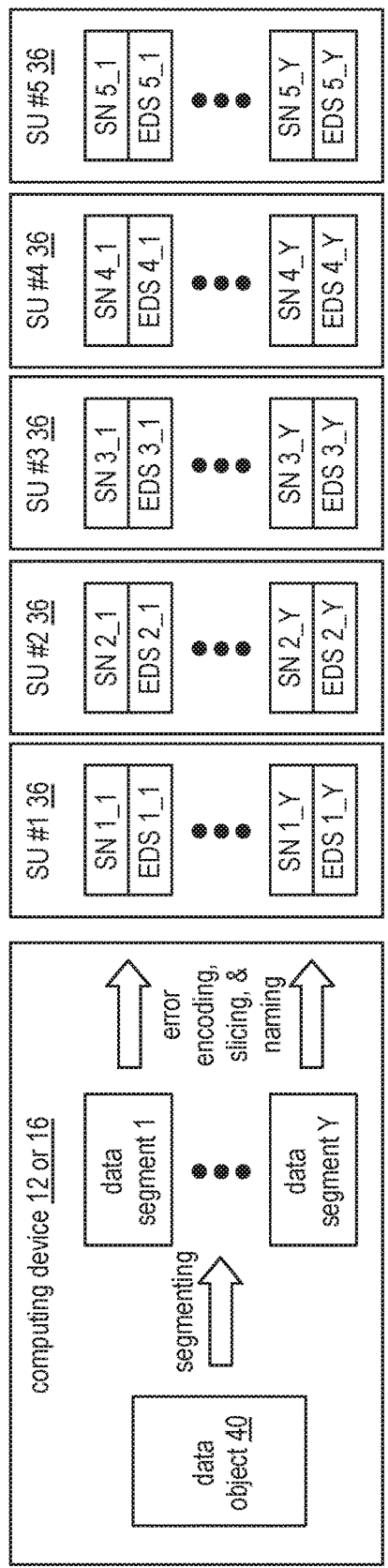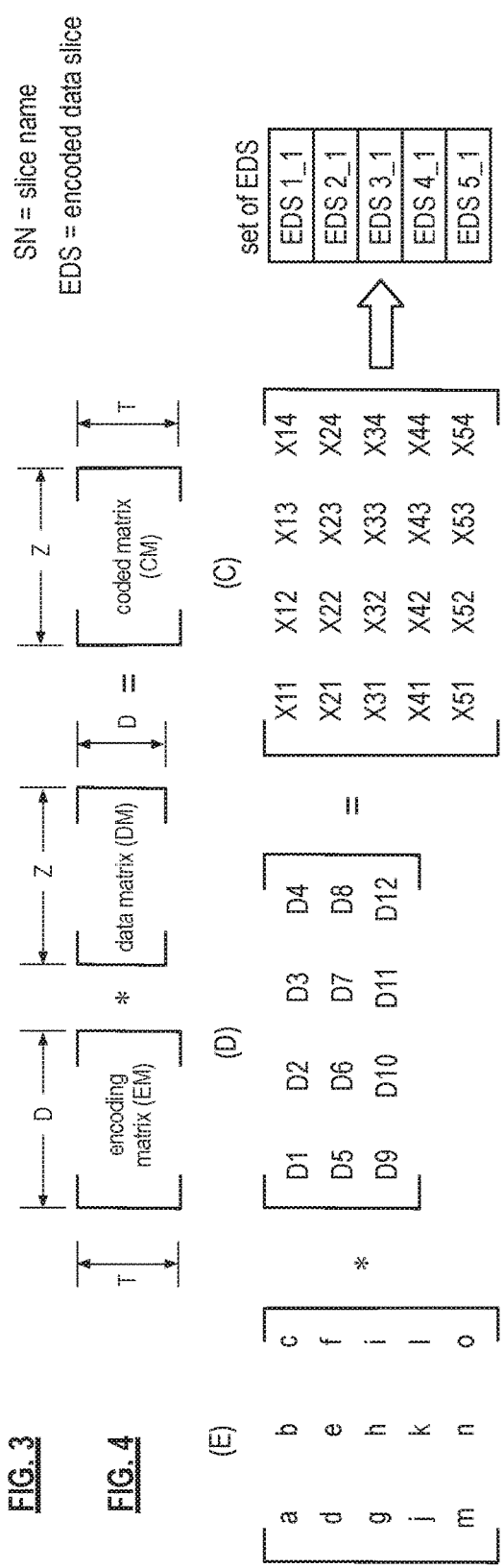
FIG. 3
FIG. 4
FIG. 5
FIG. 6

REQUESTER-ASSOCIATED STORAGE ENTITY DATA

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

As is further known, requesters of data of an Internet storage system may have various policies and metadata attributes associated with the data stored in the system. Metadata can include arbitrary attributes such as key-value pairs but additionally may specify policies or actions to be performed at certain times.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

Figure 9:
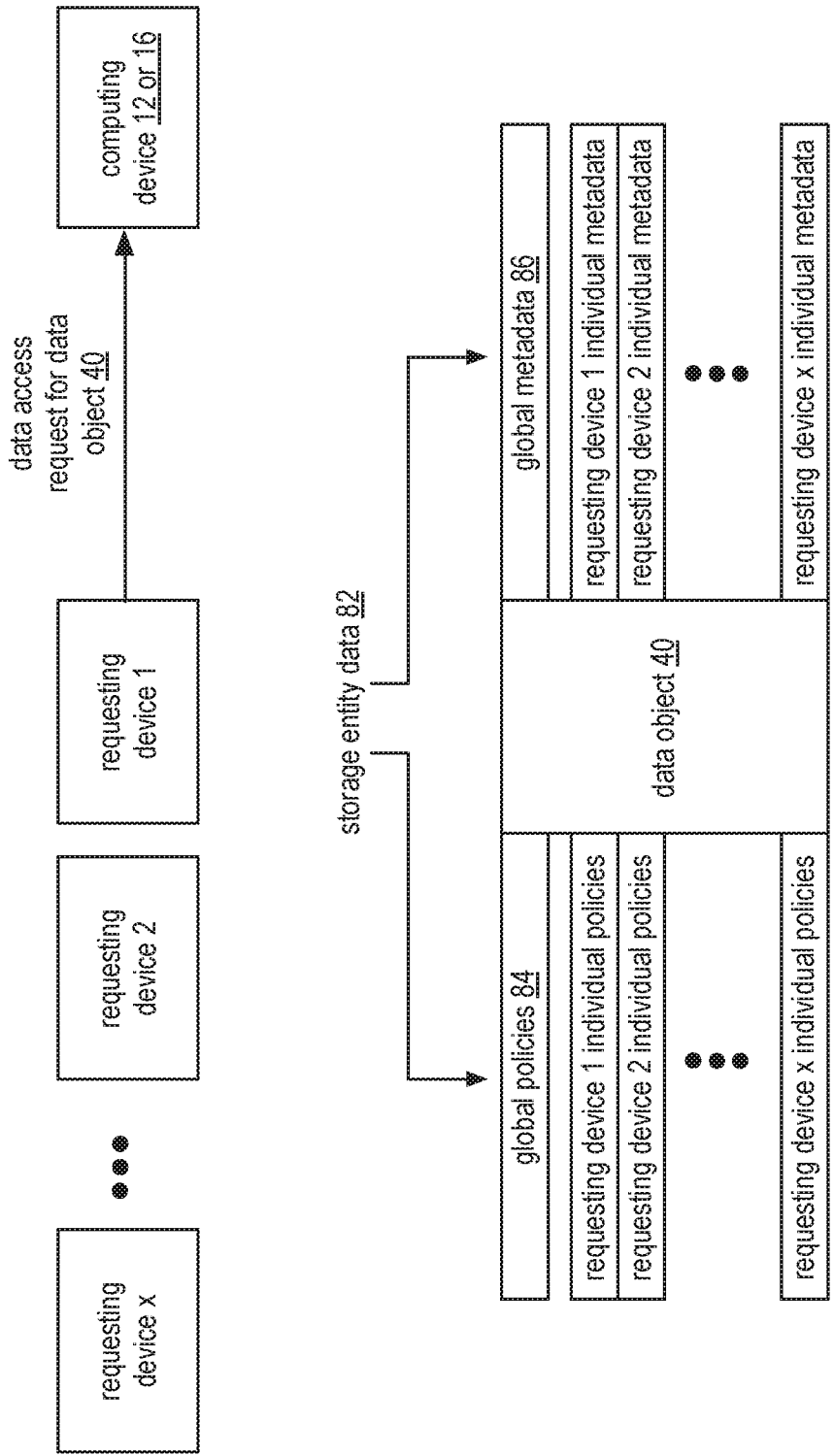
Figure 10:
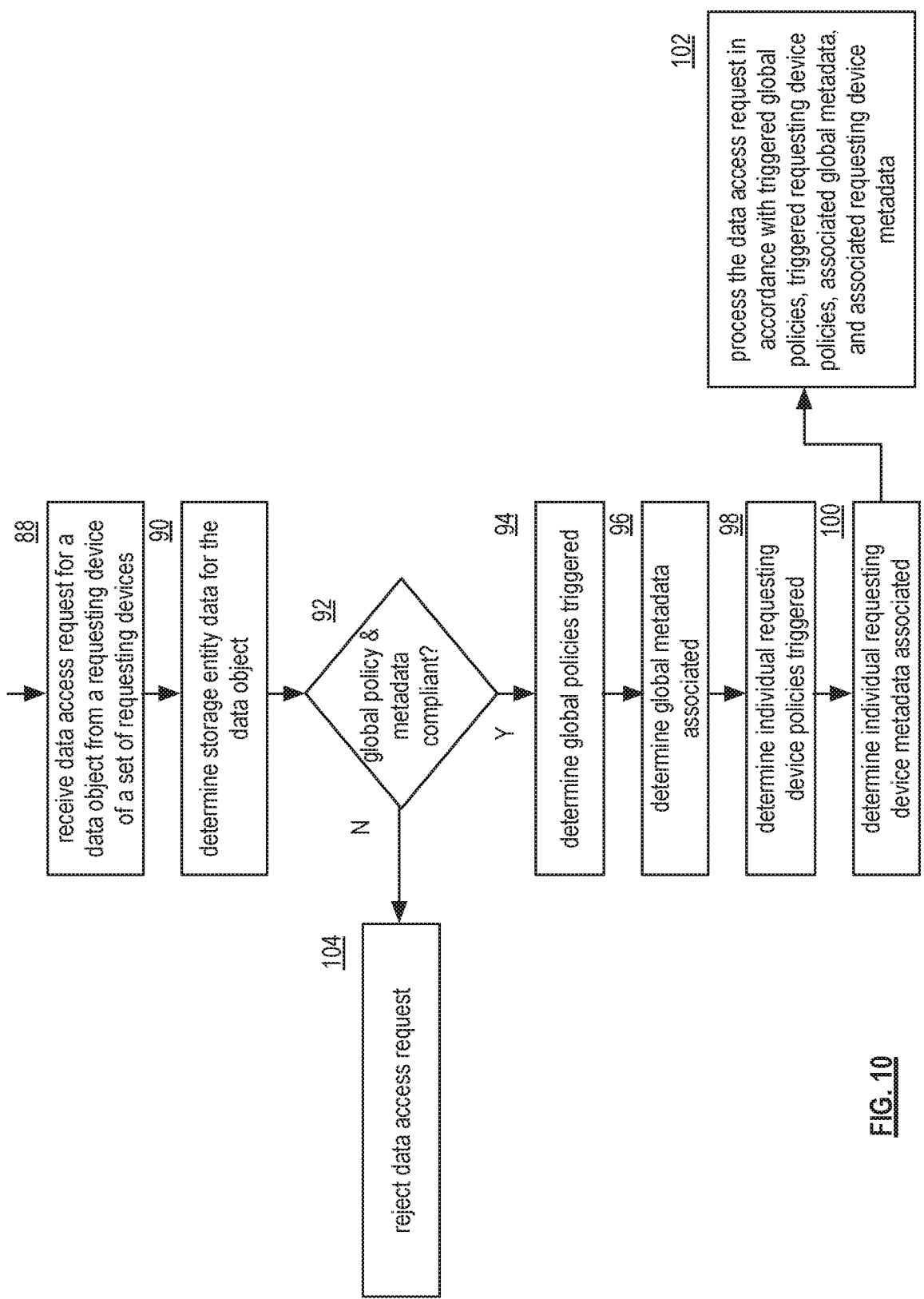

FIG. 9 is a schematic block diagram of an example of processing a data access request in accordance with storage entity data within a dispersed storage network (DSN) in accordance with the present invention; and FIG. 10 is a logic diagram of an example of a method of processing a data access request in accordance with storage entity data within a dispersed storage network (DSN) in accordance with the present invention.

DETAILED DESCRIPTION OF THE INVENTION

Figure 1:
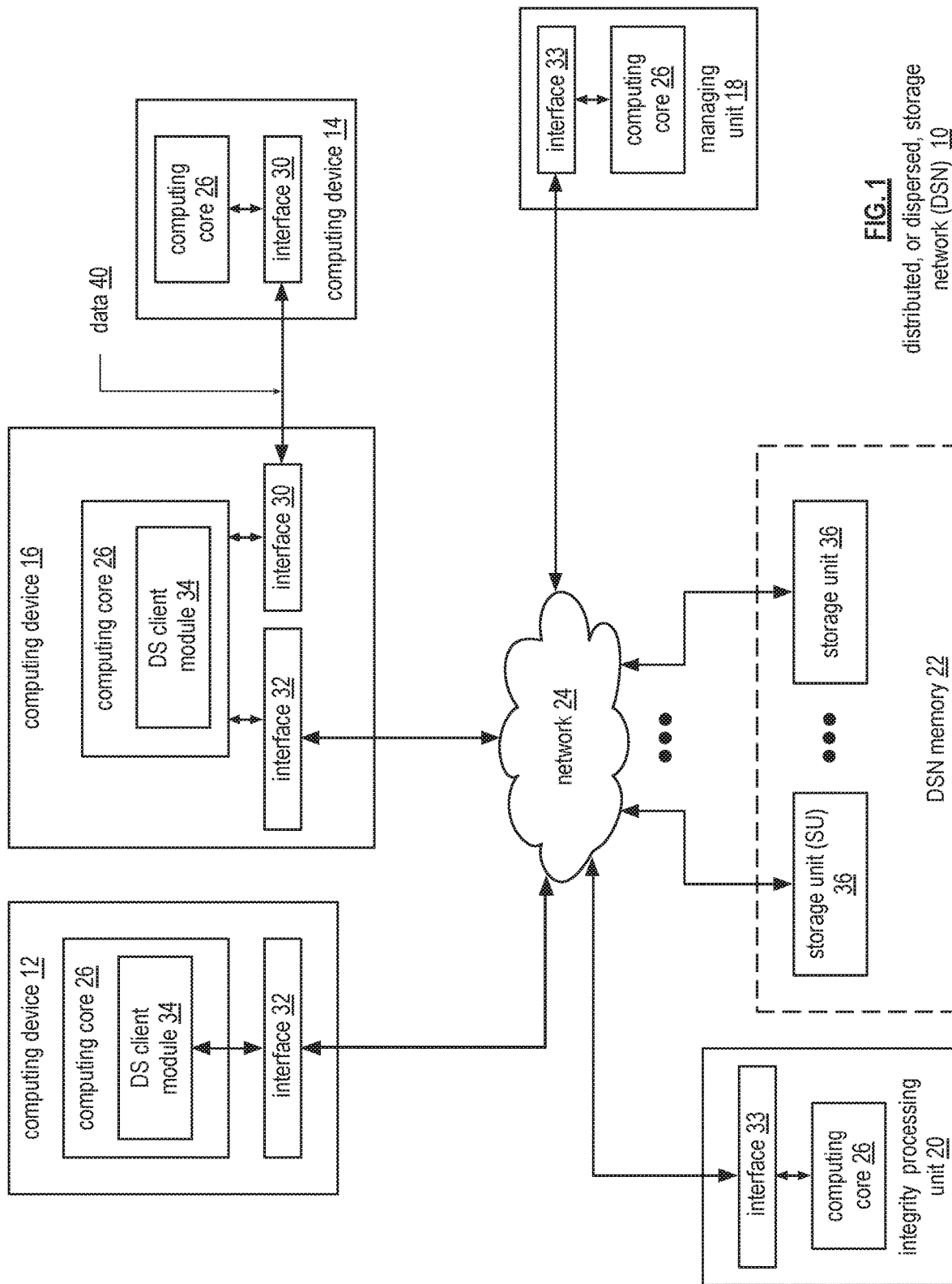
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
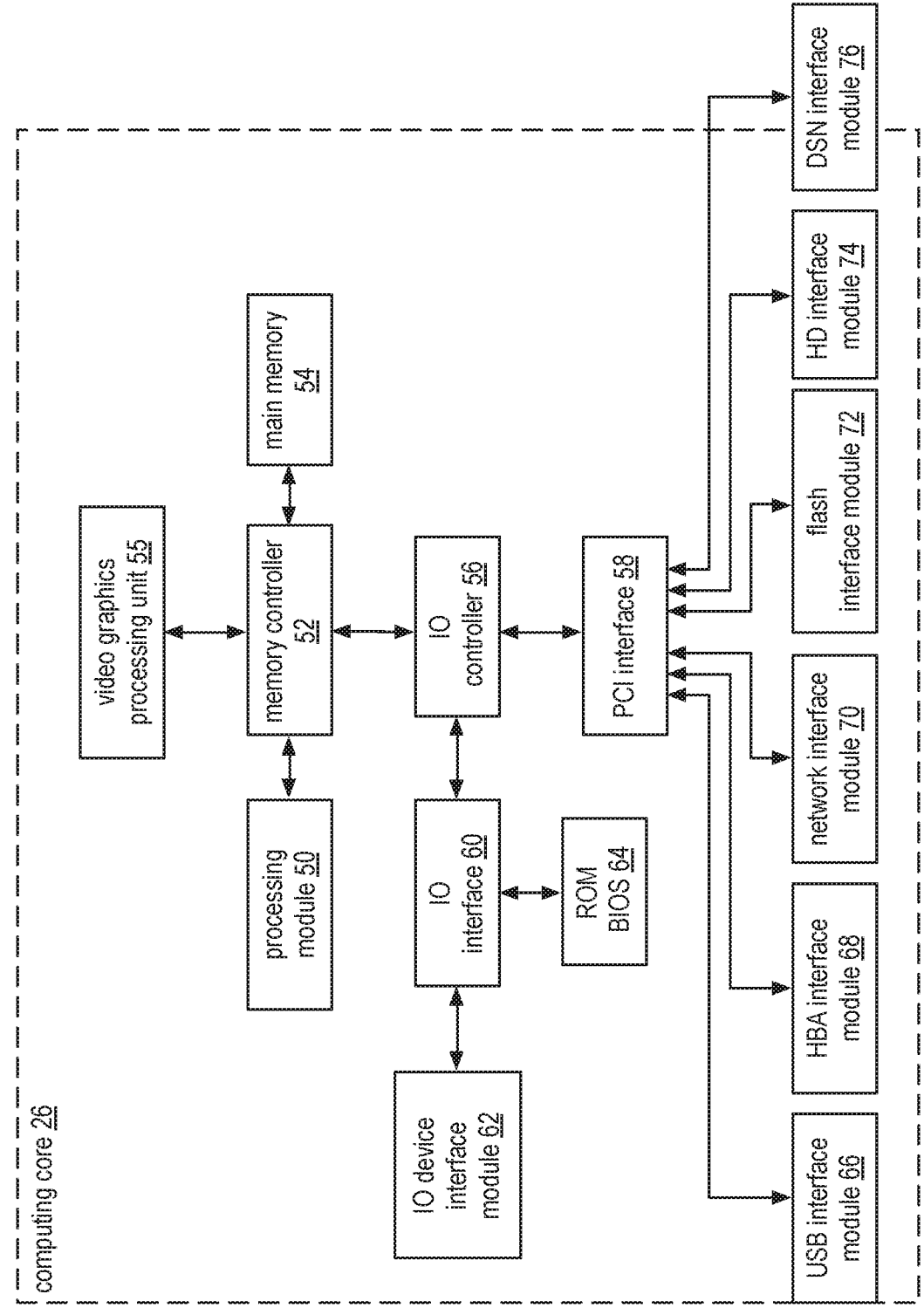
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
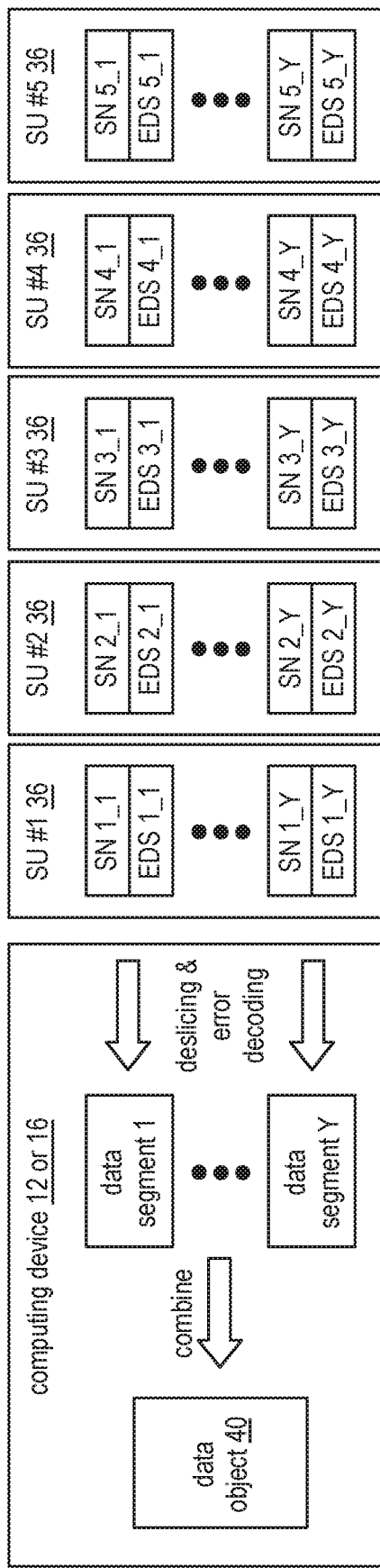
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
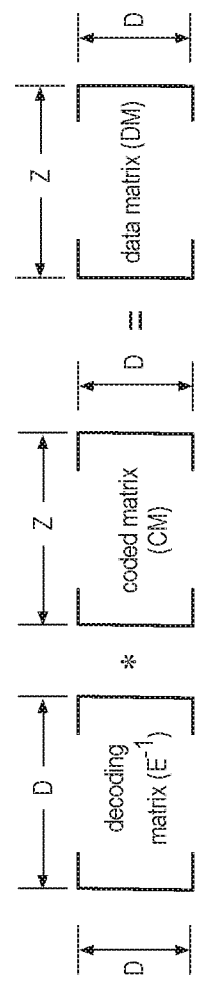
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

FIG. 9 is a schematic block diagram of an example of processing a data access request in accordance with storage entity data within a dispersed storage network (DSN). The DSN includes computing device 12 or 16, data object 40, and a plurality of requesting devices 1-$x$ associated with data object 40. Data object 40 includes storage entity data 82 (e.g., the storage entity data 82 is attached to the data object 40). Storage entity data 82 is attached to data object 40 and includes global policies 84, global metadata attributes 86, individual requesting device policies of each requesting device 1-$x$ (requesting device 1-$x$ individual policies), and individual requesting device metadata attributes for each requesting device 1-$x$ (requesting device 1-$x$ individual metadata attributes) pertaining to the data object 40. Storage entity data may additionally or alternatively be associated with other various storage entities within the DSN memory (e.g., data objects, containers, and vaults).

Because the storage entity data 82 includes the policies and metadata of each requesting devices 1-$x$, a data access request from one requesting device can be processed in accordance with not only the global policies and metadata attributes of the storage entity (e.g., data object 40) but in accordance with the policies and metadata attributes of each individual requesting device 1-x as well.

In an example of operation, requesting device 1 sends computing device 12 or 16 a data access request for data object 40. The computing device 12 or 16 determines storage entity data 82 for data object 40 based on at least one of data object 40, a vault in which data object 40 is stored, and a container in which data object 40 is stored. The computing device 12 or 16 determines the storage entity data 82 for data object 40 by accessing the storage entity data 82 attached to data object 40. The storage entity data 82 includes global storage entity data (e.g., global policies and global metadata attributes) and requesting device-associated storage entity data (e.g., individual requesting device policies and individual requesting device metadata attributes of each requesting device 1-x).

The global storage entity data is accessible by all requesting devices 1-x of the DSN that have access to data object 40. The global metadata attributes 86 include attributes pertaining to storage location, data format, and data size of the storage entity. The global policies 84 include read access, write access, delete access, and modify access policies regarding data object 40. Global policies are triggered by actions of data access requests and drive certain behaviors associated with data object 40. An action of the data access request is one or more of: reading data object 40, writing data object 40, modifying data object 40, and deleting data object 40.

Each requesting device 1-x may access its own unique requesting device-associated storage entity data but not the requesting device-associated storage entity data unique to other requesting devices. The individual requesting device metadata attributes of each requesting device 1-x includes metadata attributes pertaining to the individual preferences of each requesting device 1-x regarding data object 40 access. For example, if data object 40 is a music file, a requesting device 1 individual metadata attribute may be equalizer settings for playback of the music file using the metadata field "eq-settings." A requesting device 2 individual metadata attribute may also be equalizer settings for playback of the music file using the metadata field "eq-settings" but set to a different value than requesting device 1 due to requesting device 2's different requesting device preferences. Further, requesting device 1 can update its equalizer settings (thus updating its individual metadata attributes) but cannot update requesting device 2's metadata attributes.

The individual requesting device policies of each requesting device 1-x include policies pertaining to individual preferences of each requesting device 1-x regarding at least one of access information regarding the data object 40 and storage modifications of the data object 40. Individual requesting device policies drive behaviors desired by the individual requesting devices and are triggered by the actions of data access requests (e.g., reading data object 40, writing data object 40, modifying data object 40, and deleting data object 40). For example, if data object 40 is a music file, a requesting device 1 individual policy may indicate a notification enabled setting that notifies requesting device 1 when the music file is uploaded (e.g., the action is writing the data object 40) and indicates where to publish the message. A requesting device 2 individual policy may also indicate a notification enabled setting that notifies requesting device 2 when the music file is uploaded, however this policy would indicate a different location to publish the message in comparison to the requesting device 1 policy.

After the storage entity data 82 is determined, the computing device 12 or 16 determines whether an action of the data access request for data object 40 is compliant with the global policies 84 and is consistent with the global metadata attributes 86 of the storage entity data 82. An action of the data access request is one or more of: reading data object 40, writing data object 40, modifying data object 40, and deleting data object 40. The global metadata attributes 86 include attributes pertaining to storage location, data format, and data size of the storage entity. The global policies 84 include read access, write access, delete access, and modify access policies regarding data object 40. A global policy of the global policies 84 may specify that data object 40 is read only. Therefore, any action to write, modify, or delete the data object would not be compliant with the global policy. As another example, a global metadata attribute of the global metadata attributes 86 may specify a size restriction on the data object 40. Therefore, any action to modify the data object 40 outside that size restriction would not be consistent with the global metadata attribute.

When the action of the data access request is compliant with the global policy and is consistent with the global metadata attributes, the computing device 12 or 16 determines whether the action of the data access request triggers one or more global policies of the global policies 84. For example, a global policy may indicate an automatic backup feature to an additional storage system when performing a write action on data object 40. The write action would thus trigger the global "back up" policy. The computing device 12 or 16 also determines one or more global metadata attributes associated with the action of the data access request. For example, a global metadata attribute identifies a backup location for automatic backups triggered by write actions. The backup location metadata would thus be associated with the write action.

The computing device 12 or 16 determines whether the action of the data access request triggers one or more individual requesting device policies of the individual requesting device policies of each requesting device 1-x. For example, if the action of the data access request is to delete data object 40, any requesting device policies regarding deleting an object are identified by the computing device 12 or 16. For instance, requesting device 1 may have a policy to receive a notification when a data object is deleted. Requesting device 2 may also have a policy to receive a notification when a data object is deleted and to additionally store a local copy of the data object prior to deletion. Thus, a delete action would alert computing device 12 or 16 to these requesting device policies.

The computing device 12 or 16 determines one or more individual requesting device metadata attributes of the individual requesting device metadata attributes of each requesting device 1-x associated with the action of the data access request. For example, if the action of the data access request is to write the data object 40, the computing device determines all individual requesting device metadata attributes associated with writing data object 40. For example, the computing device 12 or 16 determines that requesting device 1 requires a particular file name format for newly written data objects.

The computing device 12 or 16 processes the action of the data access request in accordance with the one or more triggered global policies, the one or more associated global metadata attributes, the one or more triggered individual requesting device policies, and the one or more associated individual requesting device metadata attributes. For example, the data object 40 is a music file and the action of the data access request is to upload the music file. The upload triggers a global policy of an automatic backup of the music file and individual requesting device policies of requesting devices 1 and 2 requiring upload notifications. In addition to the triggered policies, a global metadata attribute of automatic backup location and the individual requesting device metadata attributes of equalizer settings of requesting devices 1-$x$ are determined to be associated with the upload action. When the music file upload occurs, the policies are executed (the file is automatically backed up and the requesting devices 1 and 2 receive upload notifications) and the metadata attributes are used, acknowledged, and/or updated (the automatic backup location is used and the equalizer settings for each requesting device are added).

FIG. 10 is a logic diagram of an example of a method of processing a data access request in accordance with storage entity data within a dispersed storage network (DSN). The method begins with step 88 where a computing device receives a data access request for a data object from a requesting device of a set of requesting devices associated with the data object of a plurality of requesting devices of the DSN.

The method continues with step 90 where the computing device determines storage entity data for the data object based on at least one of: the data object, a vault in which the data object is stored, and a container in which the data object is stored. Storage entity data includes global policies, global metadata attributes, individual requesting device policies of each requesting device of the set of requesting devices, and individual requesting device metadata attributes of each requesting device of the set of requesting devices. Storage entity data may additionally or alternatively be associated with other various storage entities within the DSN memory (e.g., data objects, containers, and vaults). The computing device determines the storage entity data for the data object by accessing the storage entity data attached to data object.

The global storage entity data (e.g., global policies and global metadata attributes) is accessible by the set of requesting devices associated with the data object. The global metadata attributes include attributes pertaining to storage location, data format, and data size of the storage entity. The global policies include read access, write access, delete access, and modify access policies regarding the data object. Global policies are triggered by actions of data access requests and drive certain behaviors associated with the data object. An action of the data access request is one or more of: reading the data object, writing the data object, modifying the data object, and deleting the data object.

Each requesting device of the set of requesting devices may access its own unique requesting device-associated storage entity data (e.g., individual requesting device policies and individual requesting device metadata attributes) but not the requesting device-associated storage entity data unique to other requesting devices. The individual requesting device metadata attributes of each requesting device includes metadata attributes pertaining to the individual preferences of each requesting device regarding data object access. For example, if the data object is a music file, an individual metadata attribute of the requesting device may be equalizer settings for playback of the music file using the metadata field "eq-settings." An individual metadata attribute of a second requesting device may also be equalizer settings for playback of the music file using the metadata field "eq-settings" but set to a different value than the requesting device due to the second requesting device's individual requesting device preferences. Further, the requesting device can update its equalizer settings (thus updating its individual metadata attributes) but cannot update the second requesting device's metadata attributes.

The individual requesting device policies of each requesting device include policies pertaining to individual preferences of each requesting device regarding at least one of access information regarding the data object and storage modifications of the data object. Individual requesting device policies drive behaviors desired by the individual requesting devices and are triggered by the actions of data access requests (e.g., reading the data object, writing the data object, modifying the data object, and deleting the data object). For example, if the data object is a music file, an individual requesting device policy of the requesting device may indicate a notification enabled setting that notifies the requesting device when the music file is uploaded (e.g., the action is writing the data object) and indicates where to publish the message. An individual requesting device policy of a second requesting device may also indicate a notification enabled setting that notifies the second requesting device when the music file is uploaded, however this policy would indicate a different location to publish the message in comparison to the requesting device's policy.

After the storage entity data is determined, the method continues with step 92 where the computing device determines whether an action of the data access request for data object is compliant with the global policies and is consistent with the global metadata attributes of the storage entity data. An action of the data access request is one or more of: reading the data object, writing the data object, modifying the data object, and deleting the data object. The global metadata attributes include attributes pertaining to storage location, data format, and data size of the storage entity. The global policies include read access, write access, delete access, and modify access policies regarding data object. For example, a global policy of the global policies may specify that the data object is read only. Therefore, any action to write, modify, or delete the data object would not be compliant with the global policy. As another example, a global metadata attribute of the global metadata attributes may specify a size restriction on the data object. Therefore, any action to modify the data object outside that size restriction would not be consistent with the global metadata attribute. When the computing device determines that the action of the data access request for data object is not compliant with the global policies and/or is not consistent with the global metadata attributes of the storage entity data, the method continues with step 104 where the computing device rejects the data access request.

When the action of the data access request is compliant with the global policy and is consistent with the global metadata attributes, the method continues with step 94 where the computing device determines whether the action of the data access request triggers one or more global policies of the global policies. For example, a global policy may indicate an automatic backup feature to an additional storage system when performing a write action on data object. The write action would thus trigger the global "back up" policy. The method continues with step 96 where the computing device determines whether one or more global metadata attributes are associated with the action of the data access request. For example, a global metadata attribute identifies a backup location for automatic backups triggered by write actions. The backup location metadata would thus be associated with the write action.

The method continues with step 98 where the computing device determines whether the action of the data access request triggers one or more individual requesting device policies of the individual requesting device policies of each requesting device. For example, if the action of the data access request is to delete the data object, any requesting device policies regarding deleting an object are identified by the computing device. For instance, the requesting device may have a policy to receive a notification when a data object is deleted. A second requesting device may also have a policy to receive a notification when a data object is deleted and to additionally store a local copy of the data object prior to deletion. Thus, a delete action would alert the computing device to these requesting device policies.

The method continues with step 100 where the computing device determines whether one or more individual requesting device metadata attributes of the individual requesting device metadata attributes of each requesting device are associated with the action of the data access request. For example, if the action of the data access request is to write the data object, the computing device determines all individual requesting device metadata attributes associated with writing data object. For example, the computing device determines that the requesting device requires a particular file name format for newly written data objects.

The method continues with step 102 where the computing device processes the action of the data access request in accordance with the one or more triggered global policies, the one or more associated global metadata attributes, the one or more triggered individual requesting device policies, and the one or more associated individual requesting device metadata attributes. For example, the data object is a music file and the action of the data access request is to upload the music file. The upload triggers a global policy of an automatic backup of the music file and individual requesting device policies of the requesting device and a second requesting device requiring upload notifications. In addition to the triggered policies, a global metadata attribute of automatic backup location and the individual requesting device metadata attributes of equalizer settings of the requesting device and a second requesting device are determined to be associated with the upload action. When the music file upload occurs, the policies are executed (the file is automatically backed up and the requesting device and second requesting device receive upload notifications) and the metadata attributes are used, acknowledged, and/or updated (the automatic backup location is used and the equalizer settings for each requesting device are added).

If the computing device does not determine any of the one or more triggered global policies, the one or more associated global metadata attributes, the one or more triggered individual requesting device policies, and the one or more associated individual requesting device metadata attributes, the computing device processes the data access request for the requesting device normally.

As another example of processing the data access request, when the action of the data access request is modification of the data object, the computing device determines whether the modification of the data object is compliant with the global policies and consistent with the global metadata attributes (e.g., the computing device determines whether the file is read only, etc.). When the modification of the data object is compliant with the global policies and consistent with the global metadata attributes, the computing device determines whether the modification of the data object triggers one or more modification global policies (e.g., the computing device determines an automatic backup feature to store the original data object upon modification). The computing device determines whether one or more global metadata attributes are associated with the modification of the data access request (e.g., the computing device determines a location to store the automatically backed up copy of the original data object upon modification). The computing device determines whether the modification of the data object triggers one or more individual requesting device modification policies of the individual requesting device policies of each requesting device of the set of requesting devices (e.g., the computing device determines a modification notification setting for a second requesting device). The computing device determines whether one or more individual requesting device metadata attributes of the individual requesting device metadata attributes of each requesting device of the set of requesting devices are associated with the modification of the data object (e.g., the computing device determines a publication location for the modification notification setting for the second requesting device).

The computing device processes the modification of the data object in accordance with the one or more triggered global modification policies (e.g., the data object is automatically backed up), the one or more modification associated global metadata attributes (e.g., the automatically backed up data object is stored in the specified location), the one or more triggered individual requesting device modification policies (e.g., the second requesting device receives a modification notification), and the one or more modification associated individual requesting device metadata attributes (e.g., the modification notification is published to the designated area).

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method, comprising:
receiving, by a computing device of a dispersed storage network (DSN), a data access request for a data object from a requesting device of a set of requesting devices of a plurality of requesting devices of the DSN, wherein the set of requesting devices are associated with the data object, and wherein the set of requesting devices includes at least two requesting devices;
determining, by the computing device, global storage entity data for the data object based on at least one of: the data object, a vault in which the data object is stored, and a container in which the data object is stored, wherein the global storage entity data includes global metadata attributes and global policies;
determining, by the computing device, requesting device storage entity data for the data object, wherein the requesting device storage entity data includes individual requesting device metadata attributes of each requesting device of the set of requesting devices, and individual requesting device policies of each requesting device of the set of requesting devices;
determining, by the computing device, whether an action of the data access request is compliant with the global policies and is consistent with the global metadata attributes; and
when the action of the data access request is compliant with the global policies and is consistent with the global metadata attributes:
determining, by the computing device, whether the action of the data access request triggers one or more global policies of the global policies;
determining, by the computing device, whether one or more global metadata attributes of the global metadata attributes are associated with the action of the data access request;
determining, by the computing device, whether the action of the data access request triggers one or more individual requesting device policies of the individual requesting device policies of each requesting device of the set of requesting devices;
determining, by the computing device, whether one or more individual requesting device metadata attributes of the individual requesting device metadata attributes of each requesting device of the set of requesting devices are associated with the action of the data access request by determining all individual device metadata attributes associated with the action of the data access request, including whether each requesting device requires a particular file name format for new data objects; and
processing, by the computing device, the action of the data access request in accordance with the one or more triggered global policies, the one or more associated global metadata attributes, the one or more triggered individual requesting device policies, and the one or more associated individual requesting device metadata attributes;
using, by the computing device, the individual requesting device metadata attributes of each requesting device upon the processing of the action of the data access request;
acknowledging, by the computing device, a use of the individual requesting device metadata attributes of each requesting device upon the processing of the action of the data access request; and
updating, by the computing device, device metadata attributes of a first requesting device upon the processing of the action of the data access request,
wherein:
the global metadata attributes include storage location, data format, and data size;
the global policies include read access, write access, delete access, and modify access;
the individual requesting device metadata attributes include an individual requesting device preference regarding data object access;
the individual requesting device policies include an individual requesting device preference regarding at least one of access information regarding the data object and storage modifications of the data object;
the data object is a music file and the action of the data access request includes uploading the music file, which triggers a global policy of an automatic backup of the music file at an automatic backup location and individual requesting device policies of the requesting device requiring upload notifications;
wherein a global metadata attribute of the automatic backup location is determined to be associated with the upload action and individual requesting device metadata attributes of equalizer settings of the requesting device and a second requesting device are determined to be associated with the upload action so that when the music file upload occurs; and
the file is automatically backed up and the requesting device and the second requesting device receive upload notifications and the metadata attributes of the equalizer settings are used, acknowledged, and updated to ensure the automatic backup location is used and the equalizer settings for each requesting device are added.

2. The method of claim 1, wherein the action of the data access request comprises one or more of:
reading the data object;
writing the data object;
modifying the data object; and
deleting the data object.

3. The method of claim 1, wherein:
the equalizer settings of the requesting device are for a playback of the music file; and
an individual requesting device policy of the individual requesting device policies of the requesting device is a notification enabled setting, wherein the notification enabled setting notifies the requesting device when the music file is uploaded.

4. The method of claim 3, wherein:
the equalizer settings of the second requesting device are for the playback of the music file; and
an individual requesting device policy of the individual requesting device policies of the second requesting device is a second notification enabled setting, wherein the second notification enabled setting notifies the second requesting device when the music file is uploaded.

5. The method of claim 1, further comprising:
when the action of the data access request is modification of the data object:
  determining, by the computing device, whether the modification of the data object is compliant with the global policies and consistent with the global metadata attributes; and
  when the modification of the data object is compliant with the global policies and consistent with the global metadata attributes:
    determining, by the computing device, whether the modification of the data object triggers one or more global policies of the global policies regarding modification of the data object;
    determining, by the computing device, whether one or more global metadata attributes of the global metadata attributes are associated with the modification of the data object;
    determining, by the computing device, whether the modification of the data object triggers one or more individual requesting device policies of the individual requesting device policies regarding modification of the data object of the data object of each requesting device of the set of requesting devices;
    determining, by the computing device, whether one or more individual requesting device metadata attributes of the individual requesting device metadata attributes of each requesting device of the set of requesting devices are associated with the modification of the data object; and
    processing, by the computing device, the modification of the data object in accordance with the one or more triggered global policies regarding modification of the data object, the one or more modification associated global metadata attributes, the one or more triggered individual requesting device policies regarding modification of the data object, and the one or more modification associated individual requesting device metadata attributes.

6. A computing device of a dispersed storage network (DSN), the computing device comprises:
  an interface;
  memory; and
  a processing module operably coupled to the memory and the interface, wherein the processing module is operable to:
    receive a data access request for a data object from a requesting device of a set of requesting devices of a plurality of requesting devices of the DSN, wherein the set of requesting devices are associated with the data object, and wherein the set of requesting devices includes at least two requesting devices;
    determine global storage entity data for the data object based on at least one of: the data object, a vault in which the data object is stored, and a container in which the data object is stored, wherein the global storage entity data includes global metadata attributes and global policies;
    determine requesting device storage entity data for the data object, wherein the requesting device storage entity data includes individual requesting device metadata attributes of each requesting device of the set of requesting devices, and individual requesting device policies of each requesting device of the set of requesting devices;
    determine whether an action of the data access request is compliant with the global policies and is consistent with the global metadata attributes;
    when the action of the data access request is compliant with the global policies and is consistent with the global metadata attributes:
      determine whether the action of the data access request triggers one or more global policies of the global policies;
      determine whether one or more global metadata attributes of the global metadata attributes are associated with the action of the data access request;
      determine whether the action of the data access request triggers one or more individual requesting device policies of the individual requesting device policies of each requesting device of the set of requesting devices;
      determine whether one or more individual requesting device metadata attributes of the individual requesting device metadata attributes of each requesting device of the set of requesting devices are associated with the action of the data access request;
      process the action of the data access request in accordance with the one or more triggered global policies, the one or more associated global metadata attributes, the one or more triggered individual requesting device policies, and the one or more associated individual requesting device metadata attributes;
      acknowledge the individual requesting device metadata attributes of each requesting device upon the processing of the action of the data access request; and
      update device metadata attributes of a first requesting device upon the processing of the action of the data access request;
    use the individual requesting device metadata attributes of each requesting device upon the processing of the action of the data access request;
    acknowledge a use of the individual requesting device metadata attributes of each requesting device upon the processing of the action of the data access request; and
    update device metadata attributes of a first requesting device upon the processing of the action of the data access request,
  wherein:
    the global metadata attributes include storage location, data format, and data size;
    the global policies include read access, write access, delete access, and modify access;
    the individual requesting device metadata attributes include an individual requesting device preference regarding data object access;
    the individual requesting device policies include an individual requesting device preference regarding at least one of access information regarding the data object and storage modifications of the data object;
    the data object is a music file and the action of the data access request includes uploading the music file, which triggers a global policy of an automatic backup of the music file at an automatic backup location and individual requesting device policies of the requesting device requiring upload notifications;
    wherein a global metadata attribute of the automatic backup location is determined to be associated with the upload action and individual requesting device metadata attributes of equalizer settings of the requesting device and a second requesting device are determined to be associated with the upload action so that when the music file upload occurs; and the file is automatically backed up and the requesting device and the second requesting device receive upload notifications and the metadata attributes of the equalizer settings are used, acknowledged, and updated to ensure the automatic backup location is used and the equalizer settings for each requesting device are added.

7. The computing device of claim 6, wherein the action of the data access request comprises one or more of:
reading the data object;
writing the data object;
modifying the data object; and
deleting the data object.

8. The computing device of claim 6, wherein:
the equalizer settings of the requesting device are for a playback of the music file; and
an individual requesting device policy of the individual requesting device policies of the requesting device is a notification enabled setting, wherein the notification enabled setting notifies the requesting device when the music file is uploaded.

9. The computing device of claim 8, wherein:
the equalizer settings of the second requesting device are for the playback of the music file; and
an individual requesting device policy of the individual requesting device policies of the second requesting device is a second notification enabled setting, wherein the second notification enabled setting notifies the second requesting device when the music file is uploaded.

10. The computing device of claim 6, wherein the processing module is further operable to:
when the action of the data access request is modification of the data object:
determine whether the modification of the data object is compliant with the global policies and consistent with the global metadata attributes; and
when the modification of the data object is compliant with the global policies and consistent with the global metadata attributes:
determine whether the modification of the data object triggers one or more global policies of the global policies regarding modification of the data object;
determine whether one or more global metadata attributes of the global metadata attributes are associated with the modification of the data object;
determine whether the modification of the data object triggers one or more individual requesting device modification policies of the individual requesting device policies regarding modification of the data object of each requesting device of the set of requesting devices;
determine whether one or more individual requesting device metadata attributes of the individual requesting device metadata attributes of each requesting device of the set of requesting devices are associated with the modification of the data object; and
process the modification of the data object in accordance with the one or more triggered global modification policies regarding modification of the data object, the one or more modification associated global metadata attributes, the one or more triggered individual requesting device modification policies regarding modification of the data object, and the one or more modification associated individual requesting device metadata attributes.

11. A computer readable memory, comprising:
a first memory element that stores operational instructions that, when executed by a computing device of a dispersed storage network (DSN), causes the computing device to:
receive a data access request for a data object from a requesting device of a set of requesting devices of a plurality of requesting devices of the DSN, wherein the set of requesting devices are associated with the data object, and wherein the set of requesting devices includes at least two requesting devices;
a second memory element that stores operational instructions that, when executed by the computing device, causes the computing device to:
determine global storage entity data for the data object based on at least one of the data object, a vault in which the data object is stored, and a container in which the data object is stored, wherein the global storage entity data includes global metadata attributes and global policies;
determine requesting device storage entity data for the data object, wherein the requesting device storage entity data includes individual requesting device metadata attributes of each requesting device of the set of requesting devices, and individual requesting device policies of each requesting device of the set of requesting devices;
determine whether an action of the data access request is compliant with the global policies and is consistent with the global metadata attributes;
when the action of the data access request is compliant with the global policies and is consistent with the global metadata attributes:
determine whether the action of the data access request triggers one or more global policies of the global policies;
determine whether one or more global metadata attributes of the global metadata attributes are associated with the action of the data access request;
determine whether the action of the data access request triggers one or more individual requesting device policies of the individual requesting device policies of each requesting device of the set of requesting devices;
determine whether one or more individual requesting device metadata attributes of the individual requesting device metadata attributes of each requesting device of the set of requesting devices are associated with the action of the data access request by determining all individual device metadata attributes associated with the action of the data access request, including whether each requesting device requires a particular file name format for new data objects;
a third memory element that stores operational instructions that, when executed by the computing device, causes the computing device to:
process the action of the data access request in accordance with the one or more triggered global policies, the one or more associated global metadata attributes, the one or more triggered individual requesting device policies, and the one or more associated individual requesting device metadata attributes determined by the computing device;

acknowledge the individual requesting device metadata attributes of each requesting device upon the processing of the action of the data access request; and update device metadata attributes of a first requesting device upon the processing of the action of the data access request; and a fourth memory element that stores operational instructions that, when executed by the computing device, causes the computing device to:

use the individual requesting device metadata attributes of each requesting device upon the processing of the action of the data access request;

acknowledge a use of the individual requesting device metadata attributes of each requesting device upon the processing of the action of the data access request; and update device metadata attributes of a first requesting device upon the processing of the action of the data access request, wherein:

the global metadata attributes include storage location, data format, and data size;

the global policies include read access, write access, delete access, and modify access;

the individual requesting device metadata attributes include an individual requesting device preference regarding data object access;

the individual requesting device policies include an individual requesting device preference regarding at least one of access information regarding the data object and storage modifications of the data object;

the data object is a music file and the action of the data access request includes uploading the music file, which triggers a global policy of an automatic backup of the music file at an automatic backup location and individual requesting device policies of the requesting device requiring upload notifications;

wherein a global metadata attribute of the automatic backup location is determined to be associated with the upload action and individual requesting device metadata attributes of equalizer settings of the requesting device and a second requesting device are determined to be associated with the upload action so that when the music file upload occurs; and the file is automatically backed up and the requesting device and the second requesting device receive upload notifications and the metadata attributes of the equalizer settings are used, acknowledged, and updated to ensure the automatic backup location is used and the equalizer settings for each requesting device are added.

12. The computer readable memory of claim 11, wherein the action of the data access request comprises one or more of:

reading the data object;
writing the data object;
modifying the data object; and
deleting the data object.

13. The computer readable memory of claim 11, wherein:

the equalizer settings of the second requesting device are for the playback of the music file; and an individual requesting device policy of the individual requesting device policies of the second requesting device is a second notification enabled setting, wherein the second notification enabled setting notifies the second requesting device when the music file is uploaded.

14. The computer readable memory of claim 11, further comprising:

when the action of the data access request is modification of the data object, the second memory element further stores operational instructions that, when executed by the computing device, causes the computing device to:

determine whether the modification of the data object is compliant with the global policies and consistent with the global metadata attributes;

when the modification of the data object is compliant with the global policies and consistent with the global metadata attributes:

determine whether the modification of the data object triggers one or more global policies of the global policies regarding modification of the data object;

determine whether one or more global metadata attributes of the global metadata attributes are associated with the modification of the data access request;

determine whether the modification of the data object triggers one or more individual requesting device policies of the individual requesting device policies regarding modification of the data object of each requesting device of the set of requesting devices;

determine whether one or more individual requesting device metadata attributes of the individual requesting device metadata attributes of each requesting device of the set of requesting devices are associated with the modification of the data object; and the third memory element further stores operational instructions that, when executed by the computing device, causes the computing device to:

process the modification of the data object in accordance with the one or more triggered global modification policies regarding modification of the data object, the one or more modification associated global metadata attributes, the one or more triggered individual requesting device modification policies regarding modification of the data object, and the one or more modification associated individual requesting device metadata attributes.

* * * * *